Figure 1:
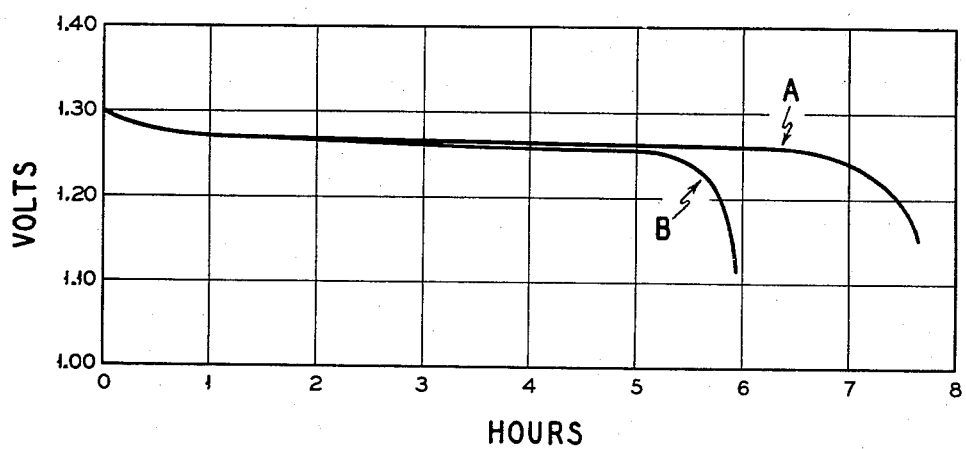

Sept. 13, 1960  A. M. HEUNINCKX  2,952,570
PROCESS FOR MAKING SINTERED TYPE CADMIUM ELECTRODES
Filed May 20, 1958

INVENTOR
ALPHONSE M. HEUNINCKX (DECEASED)
BY THAYER A. HARVEY
ADMINISTRATOR
ATTORNEY

United States Patent Office 2,952,570
Patented Sept. 13, 1960

2,952,570

PROCESS FOR MAKING SINTERED TYPE CADMIUM ELECTRODES

Alphonse M. Heuninckx, deceased, late of Lancaster, N.Y., by Thayer A. Harvey, administrator, Depew, N.Y., assignor to Union Carbide Corporation, a corporation of New York Filed May 20, 1958, Ser. No. 736,558

2 Claims. (Cl. 117—230)

This invention relates to a process for making sintered type cadmium electrodes for use in alkaline secondary cells, and, more particularly, to a novel method of converting impregnated cadmium nitrate to electrochemically active cadmium oxide within the pores of a sintered nickel plate.

The process now used in the art for making sintered type cadmium electrodes is practiced by dipping a sintered nickel plaque in a saturated cadmium nitrate aqueous solution, followed by cathodic polarization in a strong, hot, sodium hydroxide solution. Polarization holds nitrate in the pores of the impregnated plaque or plate, as it is now called, while chemical reactions convert the cadmium nitrate to cadmium hydroxide. The plate is then washed in running hot water to remove the sodium nitrate and other reaction products of the polarization step, and is subsequently dried to reopen its pores for repetition of the entire cycle, which is customarily repeated at least four times.

The above washing step is critical and may last as long as three hours until the effluent water has a pH of 9, and each succeeding cycle makes the washing more difficult.

The main disadvantages of the above method are that it is time consuming and costly, and, moreover, the electrodes so produced are not particularly efficient.

One of the principal objects of the invention is to convert impregnated cadmium nitrate to electrochemically active cadmium oxide within the pores of a sintered nickel plate by a novel method which will give an electrode which is initially more efficient, and is also more stable throughout its life than electrodes produced by the method now used in the art.

Another important object of the invention is to provide an improved electrode characterized by economy of manufacture.

The objects of the invention are accomplished by the novel method in which the impregnated cadmium nitrate is converted to cadmium oxide. Broadly stated, the invention is a method of providing impregnated cadmium oxide in a plate for use as an electrode by thermal conversion of an impregnated cadmium salt or mixture of salts in situ. More specifically, the method of the invention comprises impregnating a nickel plaque with cadmium nitrate and then thermally converting the cadmium nitrate in situ to cadmium oxide. This method eliminates the need of polarization in a caustic bath along with the accompanying washing and drying steps and gives an electrode that is more efficient at a lower cost.

As used herein and in the appended claims, the term "plaque" refers to an electrically conductive porous structure intended for use as a support for active material in a nickel-cadmium secondary cell. Conventionally the plaque is of metal with the selected metal in particulate form, the individual particles of which adhere to others of their kind. Usually the plaque comprises sintered nickel powder, and for this reason the term "sintered electrode" is frequently used in the art to refer to electrodes made therefrom, but the plaque may be formed of metal wool or felted metal fiber.

The plaque stock, used for making the comparison electrodes used in determining the efficiency of the subject method and the efficiency of the conventional method, is made by heating fine nickel powder, preferably a powder made by decomposition of nickel carbonyl, in a reducing atmosphere until the particles adhere to one another, and to a supoprt web. Ordinarily, a nickel screen is used as the support web and this serves to add strength to the finished plaque, and reduces contraction during sintering. In the preparation of the plaque used in the description given below, a screen support web offset toward one face of the plaque was used, and a plaque .050 inch thick suited capacity per unit area requirements. This offset screen aids bending of the plaque in a direction away from the screen without cracking the plaque. A small rectangle, $1\frac{7}{16}$ inches by $1\frac{3}{16}$ inches, was cut from the plaque and rolled into the form of round cylindrical surfaces of a size proper to fit into "AA" size cell containers, size AA being as defined in circular C–466 of the National Bureau of Standards of the United States Department of Commerce. The plaque stock used had a porosity minimum of 80 percent.

Illustrative of the principles of the invention, a plaque prepared as above is dipped for about 10 to 15 minutes in a room temperature saturated cadmium salt aqueous solution, the salt being sulfate, chloride, or preferably nitrate, and then the impregnated plaque or plate is placed in an air ventilated oven which has been heated to a temperature between 350° C. and 900° C., and preferably between 450° C. and 500° C., until thermal reactions take place which convert the cadmium nitrate to cadmium oxide; 10 to 15 minutes being a sufficient time if the oven is in the preferred temperature range of 450° C. to 500° C. The entire process is repeated until the correct active material weight is added to the plate. Three cycles of the invention are about equivalent to four cycles by the conventional method used in the art because of the inherent inefficiency in the polarization step due to the loss of nitrate.

As used herein and in the appended claims the term "solution" when used in reference to the cadmium salt solutions refers to solutions where the cadmium salt simply has been dissolved in a solvent, preferably water, to the molten salt, and to molten salt solutions, that is to say, solutions formed by dissolving the salts in their own water of crystallization at elevated temperatures.

If two electrodes are prepared one by the method of the invention and the other by the method now used in the art, and both start with the same basic plaque, and both are impregnated with the same weight of active materials, the novel method of the invention provides an electrode which is more efficient initially and more stable throughout life.

Figure 2:
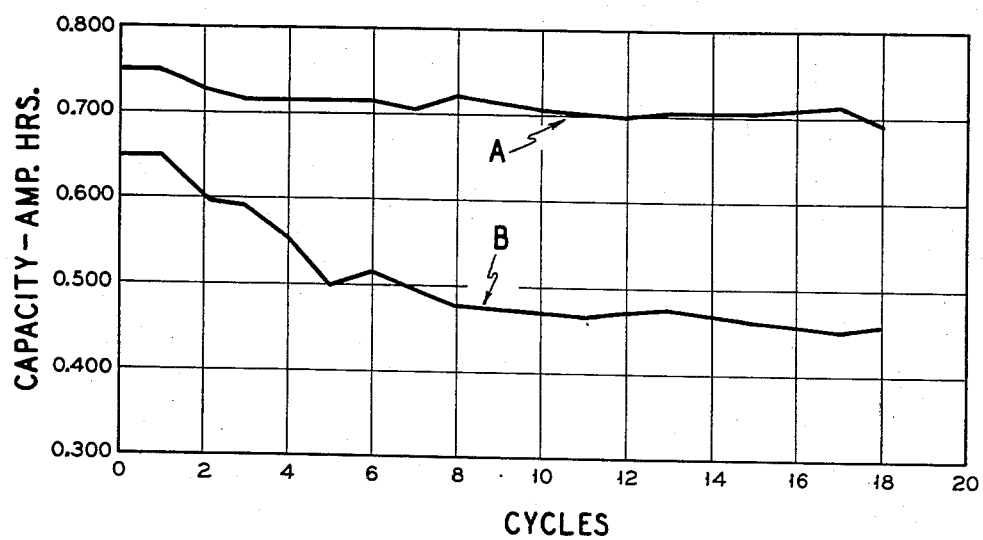

These improvements are graphically illustrated in the accompanying graphs, wherein:

Fig. 1 shows comparative discharge curves of one piece sintered negative electrodes for AA cells; and Fig. 2 shows comparative cycling curves of one piece sintered negative electrodes for AA cells.

The points that were plotted to give the curves in Figs. 1 and 2 were the results obtained from tests run on two electrodes, taken from the same plaque stock, identical in size and amount of active cadmium impregnated.

The tests consisted of charging and discharging the comparison electrodes at constant currents in open cells and in series to assure equal treatment. The electrolyte was a 25 percent potassium hydroxide aqueous solution and the charge current was 80 milliamps. Potentials were measured against nickel oxide reference electrodes.

In both Figs. 1 and 2, curve A is the curve for the electrode in which the impregnated cadmium nitrate was thermally converted to cadmium oxide within the pores of the plate, by the method of the invention, at a temperature of 450° C., and three complete impregnating cycles were performed, and curve B is the curve for the electrode in which the cadmium nitrate was converted to cadmium hydroxide within the pores of the plate by the electrolytic method of the prior art, and four complete cycles were performed.

Curves A and B in Fig. 1 show single cycle discharge voltages versus time at 100 milliamps. Examination of these curves show output efficiencies to be 82 percent for the electrode prepared by the method of the invention, and only 62 percent for the electrode prepared by the conventional method. This efficiency is figured in relation to the electrochemical equivalent of a unit weight of cadmium (1 gram cadmium=.47692 ampere hour).

Fig. 2 is a plot of ampere hours output versus number of charge-discharge cycles, and curves A and B indicate that the electrode prepared by the subject method is far more stable than the electrode prepared by the conventional method. After 18 cycles, the efficiency of the electrode prepared by the method of the subject invention is 72 percent while the efficiency of the conventionally prepared electrode has dropped to 47 percent which is more or less typical of the present commercially produced negative cadmium electrodes.

What is claimed is:

1. A process for making a cadmium electrode for a nickel-cadmium secondary cell which process comprises impregnating a porous nickel plaque with cadmium nitrate by dipping said plaque in a saturated cadmium nitrate aqueous solution for 10 to 15 minutes, and thermally converting said impregnated cadmium nitrate to cadmium oxide by placing the impregnated plaque in an air ventilated oven which has been heated to a temperature between 350° C. to 900° C., for a period of time sufficient for said conversion to take place, and subsequent repetition of the entire process until the desired active cadmium weight is added to the plaque.

2. The process of claim 1 wherein the air ventilated oven is heated to a temperature between 450° C. and 500° C.

References Cited in the file of this patent

UNITED STATES PATENTS 1,087,236     Hubbell _____ Feb. 17, 1914

FOREIGN PATENTS 331,540     Great Britain _____ July 4, 1930